United States Patent
Francis et al.

(10) Patent No.: US 11,997,741 B1
(45) Date of Patent: May 28, 2024

(54) INTELLIGENT CONNECTIVITY FOR VEHICLES

(71) Applicant: Amazon Technologies, Inc., Seattle, WA (US)

(72) Inventors: Brett Francis, Redwood City, CA (US); Nicholas Jay Lefler, Canton, GA (US); David Joseph Mifsud, Lake Stevens, WA (US); Michael Garcia, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 17/548,401

(22) Filed: Dec. 10, 2021

(51) Int. Cl.
| | |
|---|---|
| *H04W 76/00* | (2018.01) |
| *H04B 17/318* | (2015.01) |
| *H04W 76/11* | (2018.01) |
| *H04W 76/19* | (2018.01) |
| *H04W 84/02* | (2009.01) |

(52) U.S. Cl.
CPC .......... *H04W 76/19* (2018.02); *H04B 17/318* (2015.01); *H04W 76/11* (2018.02); *H04W 84/02* (2013.01)

(58) Field of Classification Search
CPC ..... H04W 76/19; H04W 76/11; H04W 84/02; H04B 17/318
See application file for complete search history.

(56) References Cited

U.S. PATENT DOCUMENTS

| | | | |
|---|---|---|---|
| 9,439,121 B2 | 9/2016 | Barreto De Miranda Sargento et al. | |
| 9,756,684 B2* | 9/2017 | Tammisetti | H04W 88/06 |
| 2020/0374216 A1* | 11/2020 | Ganesh | H04L 69/14 |
| 2022/0027197 A1* | 1/2022 | Tang | G06F 9/5072 |
| 2022/0416857 A1* | 12/2022 | Fan | H04L 5/0051 |

* cited by examiner

*Primary Examiner* — Lakeram Jangbahadur
(74) *Attorney, Agent, or Firm* — Robert C. Kowert; Kowert, Hood, Munyon, Rankin & Goetzel, P.C.

(57) ABSTRACT

A connectivity monitor of a vehicle determines current and/or future states of antennas. A workload monitor of the vehicle receives execution criteria for different workloads to be executed. An intelligent connectivity engine at the vehicle receives the current and/or future states of the antennas and the execution criteria for the respective workloads. Based on the current and/or future states of the antennas and the execution criteria for the respective workloads, the intelligent connectivity engine assigns at least one of the respective workloads for current execution and at least another of the respective workloads for future execution. A client may use an intelligent connectivity service to configure various aspects of the vehicle connectivity. For example, the client can provide workload recommendation code for the intelligent connectivity engine to assign workloads for current or future execution.

14 Claims, 8 Drawing Sheets

INTELLIGENT CONNECTIVITY FOR VEHICLES

BACKGROUND

Modern vehicles, such as cars, trucks, motorcycles, etc. may include many different software applications that each execute different workloads to perform various functions for the vehicle. For example, a safety-related application may execute a workload that performs diagnostics on brake performance. As another example, a navigation application may display a current location of the vehicle on a map. Modern cars often have multiple antennas that provide connectivity with remote sites. For example, a car may be equipped with a 4G cellular antenna, a 5G cellular antenna, and a WiFi antenna.

Sometimes an application may be unable to execute a workload because the workload requires use of a particular radio protocol that is not currently available (e.g., due to lack of signal at the vehicle's location). For example, a workload may require a 4G or 5G antenna to download a map of the local area, wherein the 4G and 5G signal may not be available due to a dead zone of coverage. This may cause undesirable results, such as failure of the workload to execute or displaying a blank screen instead of a map. As the variety of connectivity options increases and the different types of workloads grows, it can be difficult for a vehicle manufacturer to provide the features offered by different applications without running into failures due to changing signal conditions and execution of different types of workloads with different connectivity requirements.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement intelligent connectivity for vehicles, according to some embodiments. In embodiments, implementing intelligent connectivity for vehicles may improve the customer experience by reducing the amount of application failures or application degradation due to connectivity issues, compared to other techniques.

In embodiments, an intelligent connectivity engine may obtain execution criteria for different workloads of different applications as well as the current state and/or future state of different antennas (or any other connectivity options) of the vehicle. Based on the execution criteria for the different workloads as well as the current state and/or future state of different connectivity options, the intelligent connectivity engine may assign one or more workloads for current execution and assign one or more other workloads for future execution (e.g., assign to a staging queue). In response, the intelligent connectivity engine may notify one or more applications of current access to connectivity for execution of the one or more workloads and notify one or more other applications of future access to connectivity for execution of the one or more other workloads.

As used herein, the word "antenna" may be replaced with the words "connectivity option" and vice versa. For example, determining the future state of one or more antennas may be considered equivalent to determining the future state of one or more connectivity options, in embodiments. This may cover various embodiments that may include the use of one or more connectivity options other than or in addition to one or more antennas. For example, an embodiment may include a vehicle that uses several different types of antennas/wireless interfaces to communicate with a remote provider network or other remote endpoint as well as a wired interface to communicate with a remote provider network or other remote endpoint (e.g., via power-line communication over a charging network while the vehicle's battery is being charged).

In some embodiments, a connectivity option may refer to a logical representation of a network resource that can be used by an application to transmit data to endpoints. For example, in embodiments each connectivity option may be associated with specific characteristics/requirements across latency, bandwidth, cost, and/or transport of data.

In an example embodiment, a particular workload may require a 5G connection for execution, but the 5G antenna may currently be unavailable due to lack of a 5G signal. The intelligent connectivity engine may assign the particular workload to a workload staging queue for future execution (when the 5G antenna becomes available) and notify an application of future access to the 5G antenna for workload execution (e.g., due to other workloads currently using the 5G antenna). At a later time, when the intelligent connectivity engine determines that the 5G antenna is available for the workload, it will notify the application of access to the 5G antenna for execution of the workload. By leveraging knowledge of workload requirements and the state of connectivity options, embodiments may improve the performance of vehicle applications that rely on connectivity, compared to traditional techniques. For example, an application may execute other workloads and then use the 5G antenna when it becomes available, instead of hanging or re-trying the workload multiple times.

In embodiments, notifications sent from the intelligent connectivity engine to applications may be considered "recommendations" for when the applications should execute workloads. For example, a notification of access to a particular connectivity option (e.g., 5G antenna) may be considered a recommendation for the application to execute the workload at a current time (or as soon as the application is ready to) and a notification of future access to a particular connectivity option (e.g., 5G antenna) may be considered a recommendation for the application to execute the workload at a future time (e.g., at a subsequent time or at particular future time determined by the intelligent connectivity engine). In embodiments, an application may determine, based on the notification ("recommendation") and/or any other number of factors, whether to execute the workload at the current time or to wait until a later time to execute the workload (e.g., at the recommended future time or at any other future time determined by the application). Therefore, an application may execute a workload even though the recommendation is for future execution, or an application may delay execution of a workload until a future time, even though the recommendation is for current execution.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for intelligent connectivity for vehicles. A number of different methods and techniques to use intelligent connectivity for vehicles are discussed, some of which are illustrated in accompanying flowcharts. Finally, a description of an example computing system upon which the various components, modules, systems, and/or techniques described herein may be implemented is provided. Various examples are provided throughout the specification.

Figure 1:
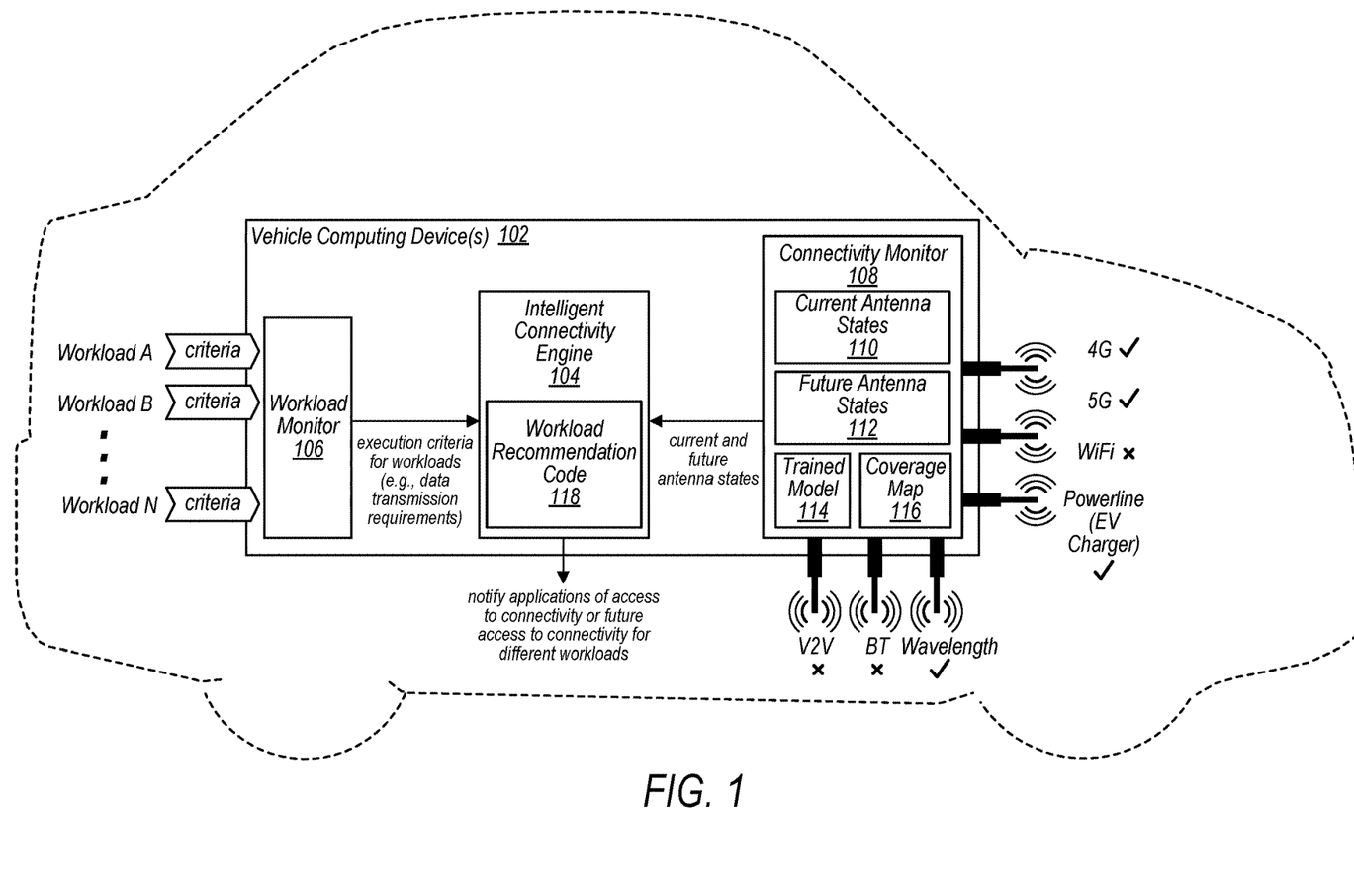
FIG. 1 is a logical block diagram illustrating a system for intelligent connectivity for vehicles, according to some embodiments.

FIG. 1 is a logical block diagram illustrating a system for intelligent connectivity for a vehicle, according to some embodiments.

In the depicted example, one or more computing devices implement an intelligent connectivity engine 104, a workload monitor 106, and a connectivity monitor 108. In various embodiments, the intelligent connectivity engine, workload monitor, and connectivity monitor may be implemented/distributed across any number of computing devices of the vehicle.

In some embodiments, the intelligent connectivity engine, workload monitor, and connectivity monitor may be implemented within a particular computing device (e.g., within a hardware module). In an embodiment, the hardware module may be initially configured at a manufacturer site or service provider site and shipped to a client for installation at the client's site (e.g., at a vehicle assembly line). In some embodiments, some or all of the intelligent connectivity engine, workload monitor, and/or connectivity monitor may be downloaded from a service provider's remote provider network (e.g., at the client's site or after the vehicle is purchased/used by a customer).

The connectivity monitor 108 may monitor/store the current antenna states 110 and/or the future antenna states 112 for any number of different antennas (or wired interfaces) of the vehicle that may each transmit/receive radio signals according to a different radio protocol (or according to different wired protocols in the case of wired interfaces). In the depicted example, the antennas include a vehicle-to-vehicle antenna (V2V), a Bluetooth antenna (BT), a wavelength antenna, a 4G antenna, a 5G antenna, a WiFi antenna, and a powerline wired interface (e.g., for use with an electric vehicle charger).

The connectivity monitor 108 may also include one or more trained models 114. A trained model may be trained to use inputs based on a current state of a connectivity options, a current location of the vehicle, a local coverage map, an expected future location of the vehicle (which may itself be determined from a trained model), and/or any other number of inputs and output a predicted future state of the connectivity option (e.g., at one or more points in time in the future and/or during one or more future time windows) based on the current state and/or other inputs. For example, the model may output a prediction that the 5G antenna will be available with maximum bandwidth capability (or available with at least a certain level of bandwidth capability) starting in 10 minutes because the predicted location of the car in 10 minutes will be at the beginning of a 5G coverage area with a strong 5G signal. In embodiments, one or more trained models may predict where a vehicle will be at any point(s) in time in the future based on any number of inputs.

In embodiments, a future location may be predicted by a model based on any number of inputs such as a current GPS (global positioning system) location, a current/planned route that the vehicle is following, and or any other inputs, such as a predicted travel speed along one or more locations or portions of the route based on current traffic congestion/conditions and/or predicted traffic congestion/conditions along the one or more locations or portions of the route. Another example of an input that may be used to predict a future location of the vehicle is location history. For example, the vehicle may have been driven to work along a specific route on a particular day of the week (e.g., Friday) or the vehicle may have been driven along a longer and/or different route when traffic was heavy along a more frequently used route. If it is Friday, then the model may use the specific route when predicting the future vehicle location. If there is traffic along the more frequently used route, then the model may use the longer and/or different route when predicting the future vehicle location. The connectivity monitor 108 may also include a coverage map 116, which may indicate a coverage area for one or more radio protocols used by the vehicle (e.g., for some or all of the antennas).

As shown, the intelligent connectivity engine includes workload recommendation code 118 that assigns application workloads for current execution or future execution. In embodiments, default workload recommendation code may be provided to the vehicle (e.g., sent from a service provider network or a manufacturer's network to the vehicle computing device). In embodiments, some or all of the workload recommendation code 118 may be developed by the client (e.g., a vehicle manufacturer). This may allow different vehicle manufacturers to develop code according to their unique requirements.

In embodiments, the connectivity monitor 108 may determine a current state and/or predicted future state of respective connectivity options of a plurality of connectivity options of the vehicle (e.g., multiple different antennas). As depicted, different connectivity options may be configured to communicate according to different radio protocols. The connectivity monitor 108 may then send to the intelligent connectivity engine 104 the current state and/or future state of the respective connectivity options.

Note that in embodiments, any of the techniques discussed herein for antennas (e.g., wireless communication interfaces) may also apply to any number of wired communications interfaces, such as the powerline interface of the depicted example. For example, some workloads may have criteria that specify the workload is required to use the powerline (or other type of wired communications interface) in order to transmit and/or receive data and those workloads may be assigned for current or future execution, based at least on the current and/or predicted state of the powerline.

The workload monitor 106 may receive execution criteria for respective workloads (e.g., workloads A-N) of a plurality of workloads to be executed. A workload may be a function or other task that is to be executed by an application. For example, a navigation application may send execution criteria for a workload that includes a minimum amount of bandwidth available to download and/or upload data (or use a particular one of the antennas, such as the 5G antenna). The workload monitor 106 may then send to the intelligent connectivity engine the execution criteria for the respective workloads.

In embodiments, the execution criteria may include any number of criteria for data transmission and/or any other criteria that must be satisfied in order to execute the workload. In embodiments, an application may only send criteria for workloads that include criteria for data transmission to and/or from the vehicle; if a particular workload does not need to use an antenna or wired interface (and is not affected by other workloads that use the antenna/wired interface), then the application may have no need to inform the workload monitor of the particular workload.

The intelligent connectivity engine 104 may receive the current state and/or future state of the respective connectivity options as well as the execution criteria for the respective workloads. Based at least on the current state and/or future state of the respective connectivity options and based on the execution criteria for the respective workloads, the intelligent connectivity engine may assign at least one of the respective workloads for current execution and at least another of the respective workloads for future execution. For example, the intelligent connectivity engine may assign workloads A and N for future execution and assign workload B for current execution.

In embodiments, the intelligent connectivity engine notifies at least one application of current access to connectivity (e.g., a 3G antenna) for execution of the at least one workload (e.g., workload B) and notify at least another application of future access to connectivity for execution of the at least another workload (e.g., workloads A and N). In response, an application (e.g., application B) may execute workload B, using the notified connectivity (e.g., the 3G antenna) and the other applications (e.g., applications A and N) may delay execution of workloads A and N.

The intelligent connectivity engine may assign workloads to a staging queue for future execution (e.g., workloads A and N). At a later time, when the intelligent connectivity engine determines that connectivity (e.g., 5G antenna) is available for a workload A, it will notify the corresponding application (e.g., application A) of access to the connectivity for workload execution. In response, the application may execute the workload A, using the available connectivity (e.g., the 5G antenna).

In some embodiments, any number of workloads may be assigned for current execution. For example, if execution criteria for workload A (of vehicle application A) indicates use of the 4G antenna and execution criteria for workload B (of vehicle application B) indicates use of the 5G antenna, then the intelligent connectivity engine 104 may assign workload A and B for current execution and notify applications A and B of current access to connectivity for workload execution. In response, applications A and B may each execute workloads A and B, using the 4G and 5G antennas concurrently.

The intelligent connectivity engine may assign a given workload for future execution in response to determining that a current state of at least one of the respective connectivity options is unable to satisfy execution criteria for the given workload. For example, the execution criteria may be a minimum upload or download bandwidth using any available connectivity option. In response to determining that none of the available connectivity options are currently capable of the minimum upload or download bandwidth, then the intelligent connectivity engine may assign a given workload for future execution.

In some embodiments, the intelligent connectivity engine may determine that a future state for a particular connectivity option at a particular time is able to satisfy the execution criteria for the given workload even though none of the available connectivity options are currently capable of satisfying the criteria (e.g., by receiving a prediction from the connectivity monitor that the particular connectivity option will have the minimum upload or download bandwidth capability at the particular time in the future). For example, a trained model 114 may predict the future state of the particular connectivity option (and corresponding time of the future state) based on a current state of the particular connectivity option and/or other input. In embodiments, the trained model may be trained based at least on data indicating one or more previous states for the particular connectivity option (e.g., a history of different states, such as minimum upload or download bandwidth capability at different times of the day).

In an embodiment, to determine the future state of a particular antenna, the connectivity monitor (or intelligent connectivity engine) may determine the future state for the particular antenna based at least on one or more of a planned route for the vehicle, a coverage map 116 for a radio protocol used by the antenna, and/or one or more environmental conditions for at least a portion of the planned route. For example, the intelligent connectivity engine may determine that, at the current vehicle speed and based on the planned route and coverage map, the future state of the particular antenna will be much higher bandwidth capability starting in 10 minutes (e.g., an upcoming strong signal area on the coverage map).

As another example, the intelligent connectivity engine may determine that, at the current vehicle speed and based on the planned route and environmental conditions at an upcoming portion of the route, the future state will be much lower bandwidth capability for the particular antenna starting in 10 minutes (e.g., storm clouds that reduce bandwidth of a satellite antenna). In various embodiments, an intelligent connectivity engine and/or connectivity monitor may predict a future state of a connectivity option at any particular time in the future with or without the use of a trained model.

In response to the determination that the future state for the particular connectivity option is able to satisfy the execution criteria for the given workload at the particular time, the intelligent connectivity engine may assign the given workload for future execution at a time corresponding to the particular time in the future (e.g., at that particular time or within a time window after that particular time). The intelligent connectivity engine may assign the workload to the staging queue and/or wait until the time corresponding to the future state (e.g., the particular time or the time after particular time); when that time corresponding to the future state arrives, the intelligent connectivity engine may notify the application of current access to the connectivity option. In response, the application may execute the workload.

In embodiments, the intelligent connectivity engine may select a particular connectivity option from among multiple connectivity options that are available for selection for a workload based at least on the current state of the multiple connectivity options and the execution criteria for the workload. For example, the criteria may indicate that the 4G and 5G antennas may be used for data transmission at a minimum bandwidth, but currently the 5G antennas may be the only one that can transmit at the minimum bandwidth. In that case, the intelligent connectivity engine may select the 5G antenna and assign the workload for current execution. The intelligent connectivity engine may then notify the application of access to the 5G antenna for workload execution.

The execution criteria that an application may specify for a given workload may include any number of criteria. For example, the execution criteria may include one or more of 1) available bandwidth to send data from the vehicle to another location or to receive data at the vehicle from another location, 2) maximum latency to send data from the vehicle to the other location or to receive data at the vehicle from the other location, and/or 3) a minimum amount of compute capability at the other location. For example, the criteria may specify a maximum latency parameter (50 milliseconds) and a minimum compute capability parameter for computational performance. The intelligent connectivity engine may determine that there is edge compute available at a nearby 5G tower that meets both of these criteria and in response, assign the workload for current execution and notify the application of access to 5G connectivity. If the tower will not be in range for 10 minutes based on the vehicle's planned route, speed, and the coverage map, then intelligent connectivity engine may assign the workload for future execution 10 minutes from now (or 10 minutes and 10 seconds from now, etc.) and notify the application of future access to 5G connectivity. In embodiments, the intelligent connectivity engine may notify the application of the time or estimated/predicted time of future access to 5G connectivity. In embodiments, the intelligent connectivity engine notifies the application when the 5G connectivity becomes available.

Figure 2:
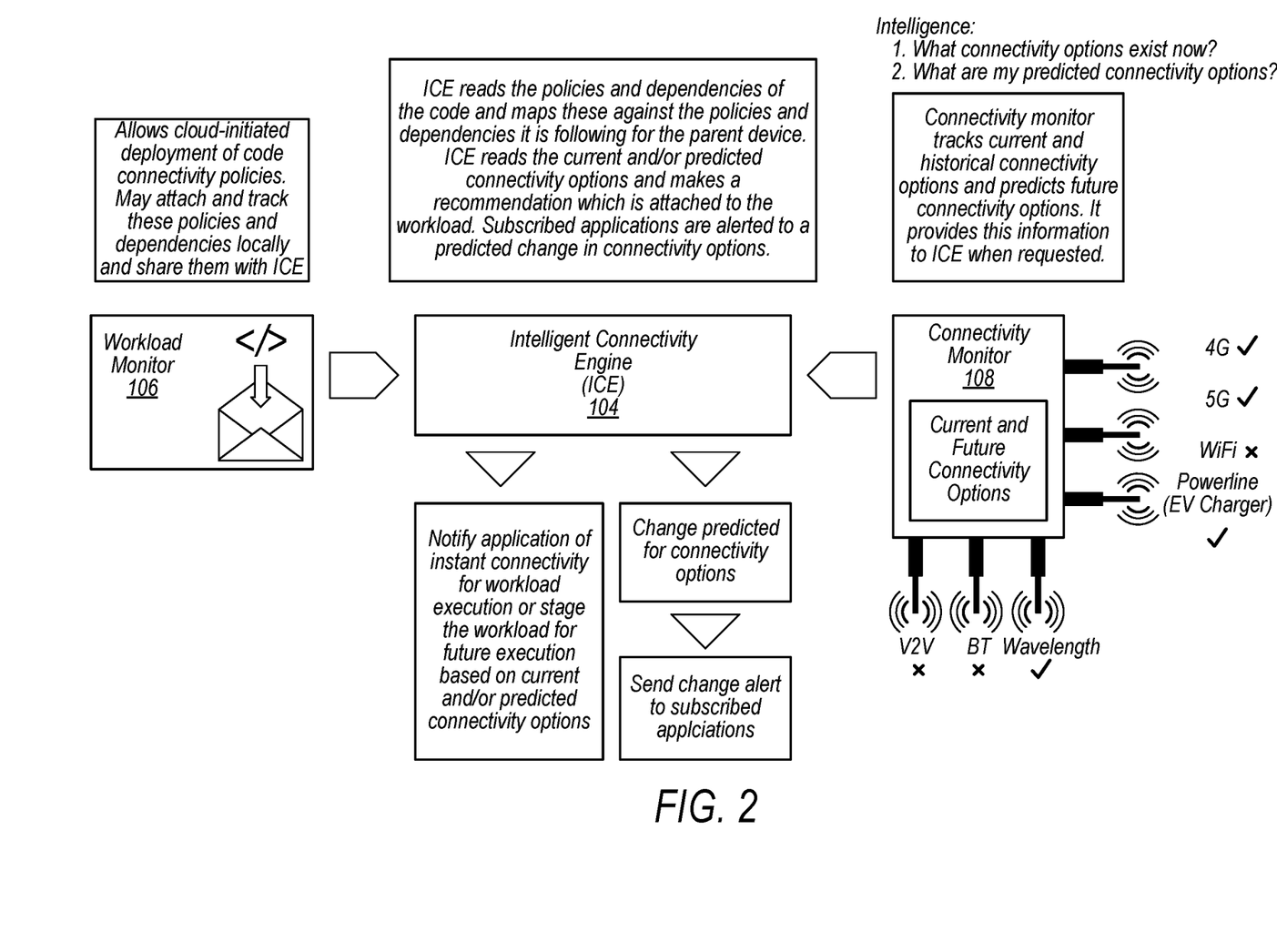
FIG. 2 illustrates an example of a process flow for a system for intelligent connectivity for vehicles, according to some embodiments.

FIG. 2 illustrates an example of a process flow for a system for intelligent connectivity for a vehicle, according to some embodiments.

In the depicted example, the connectivity monitor 108 tracks current and/or historical connectivity options (e.g., capability levels of each connectivity option, such as level of signal strength, transmission bandwidth, latency to a location such as an edge compute location or provider network, and/or compute capability at the edge compute location or provider network) and predicts future connectivity options based on the current and/or historical connectivity options (capability levels of each connectivity option, such as level of signal strength, transmission bandwidth, latency to a location such as an edge compute location or provider network, and/or compute capability at the edge compute location or provider network).

The connectivity monitor 108 may send any of the above connectivity option information to an intelligent connectivity engine 104 (ICE) (e.g., in response to a request from the intelligent connectivity engine or at a periodic/scheduled time). The workload monitor 106 may implement a workload policy (e.g., via policy code) based on cloud-initiated deployment of policy code. In embodiments, the policy may be shared with the intelligent connectivity engine. For example, the policy may be to use the least expensive connectivity option when there are multiple different connectivity options available that meet the execution criteria for a workload (e.g., to minimize cost of running the workload). As another example, the policy may be to use the highest bandwidth connectivity option when there are multiple different connectivity options available that meet the execution criteria for a workload (e.g., to minimize the time to run the workload and/or to transmit data).

In embodiments, the intelligent connectivity engine may read the workload policy and/or dependencies of the workload and map them against the policy and dependencies that the intelligent connectivity engine is following for the parent device. Based on the current, historical, and/or predicted connectivity options, the intelligent connectivity engine may assign the workload for current or future execution. In embodiments, the intelligent connectivity engine may do so by attaching a recommendation and/or the assignment to workload metadata. In embodiments, the intelligent connectivity engine may then notify applications of instant/current connectivity for workload execution and/or notify applications of future connectivity for workload execution (e.g., based on current and/or predicted connectivity options).

In some embodiments, registered/subscribed applications may be alerted to a predicted change in connectivity options. For example, application A may send to the workload monitor 106 execution criteria for workload A that indicates the 5G antenna is to be used. The intelligent connectivity engine may assign workload A for future execution in 10 minutes. However, 5 minutes later, the connectivity monitor may predict that, in 5 minutes, the level of 5G signal strength will go below a minimum signal strength specified in the execution criteria for workload A. In response, the newly predicted signal strength will be sent to application A as a change alert. Application A may then cause the intelligent connectivity engine to cancel the workload, delay the workload, or to select a different connectivity option. By providing alerts of changes to predicted connectivity to applications, the intelligent connectivity engine may provide a way for applications to make changes to the timing of a workload execution and/or changes to the connectivity option being used in order to prevent failure or performance degradation of the workload.

Figure 3:
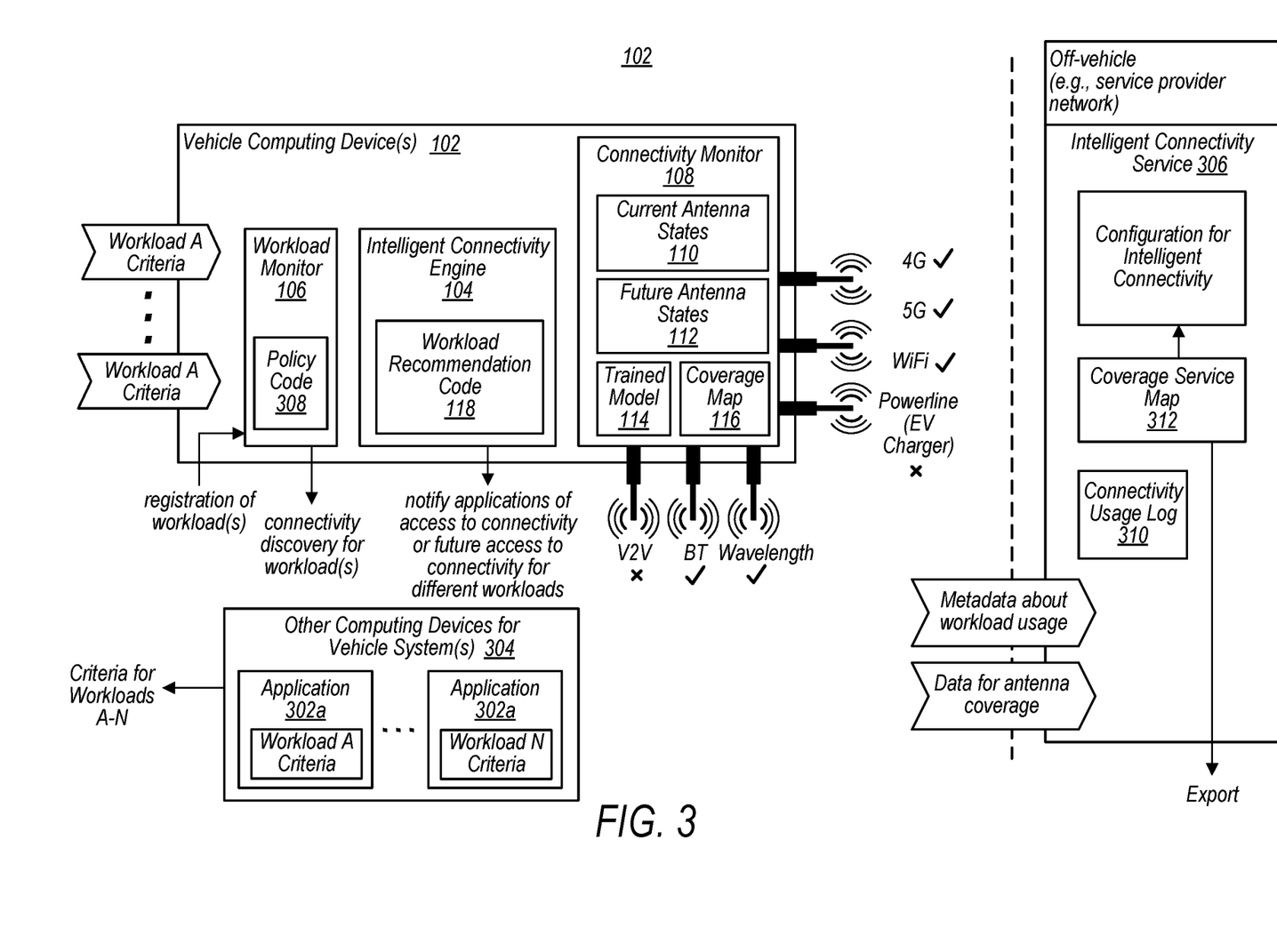
FIG. 3 is a logical block diagram illustrating a system for intelligent connectivity for vehicles, according to some embodiments.

FIG. 3 is a logical block diagram illustrating a system for intelligent connectivity for a vehicle, according to some embodiments.

In embodiments, at least some of the applications 302 running on the vehicle (e.g., another computing device(s) 304 and/or the computing device 102) may be registered. For example, a client (e.g., vehicle manufacturer) may use a remote provider network (e.g., intelligent connectivity service 306) to indicate certain applications 302 as registered. In embodiments, an application may be registered to use a particular connectivity option or to have the ability to discover available connectivity options. In embodiments, any application may execute any number of workloads, regardless of whether they are registered. In the depicted example, application 302a provides execution criteria for workload A (to be executed by application 302a) and application 302n provides execution criteria for workload N (to be executed by application 302n).

The workload monitor 106 may receive, from an application, an indication of a workload to be executed (e.g., criteria for execution of a workload). The criteria may include a particular connectivity option to be used (e.g., 5G antenna). In response, the workload monitor may determine that the application is registered to use that connectivity option and the workload monitor may reserve use of the particular connectivity option by the workload (e.g., for current execution or at a future time).

In some embodiments, the workload monitor 106 may receive, from an application, a request for available connectivity options. The workload monitor may determine that the application is registered with the ability to discover available connectivity options (connection discovery) and/or reserve connectivity options for use at a future time. In response, the workload monitor may indicate to the application and/or workload the current state of any number of respective connectivity options of the vehicle, any number of antennas are currently available, and/or any number of connectivity options that will be available at a future time. The workload monitor may receive a request from the registered application and/or registered workload to reserve use of a particular one of the respective connectivity options or available connectivity options by the workload for current execution or at a time corresponding to the future time (e.g., at the future time or after). In response, the workload monitor may reserve use of the particular connectivity option by the workload for current execution or at a time corresponding to the future time. As shown, in some embodiments a registered application may register its workload with the workload monitor 106, allowing it to reserve certain connectivity options and/or perform other tasks that are permitted for registered workloads and denied for unregistered workloads.

In embodiments, the client (e.g., vehicle manufacturer) may use a remote provider network (e.g., intelligent connectivity service 306) to indicate a workload policy to be implemented at the vehicle. In response to the reception of the indication of the workload policy, the provider network may deploy policy code 308 to the vehicle (or otherwise configure the workload monitor to implement the workload policy).

In embodiments, the policy code is configured to select a given connectivity option from among a plurality of connectivity options based at least on the workload policy indicated by the client. For example, the policy may indicate that an unregistered application and/or workload will have lower priority for reserving connectivity options than a registered application. As another example, the policy may indicate that an unregistered application and/or workload from one system (e.g., entertainment system) will have lower priority for reserving connectivity options than another unregistered application and/or workload from system B (e.g., safety system).

As shown, the service 306 may include a connectivity usage log 310 that records how often each policy was implemented to affect the execution of workflows, metadata that describes the workload criteria for different workloads, workload performance for each workload, and/or performance of the connectivity option used (e.g., transmission bandwidth using the 5G antenna). This may help an administrator to provide feedback for a client for making possible changes to the policy, the workload recommendation code, and/or registration/use of applications.

In the depicted example, data for antenna coverage may be sent from the vehicle (e.g., from the connectivity monitor) to the intelligent connectivity service 306. In embodiments, the data may include coverage data that indicates coverage area for one or more radio protocols used by the vehicle (e.g., indication of signal strength or lack of signal for different radio signals as measured by the connectivity monitor at different locations of the vehicle along past routes).

In embodiments, the intelligent connectivity service 306 may update a coverage service map 312 based on the coverage data to generate an updated coverage service map. The service may update a configuration for intelligent connectivity for the vehicle (and one or more other vehicles) based at least on the updated coverage service map. For example, the service may send/export the updated coverage service map to the vehicle and/or or one or more vehicles. Each vehicle may then update its coverage map based on the updated coverage service map (e.g., synching the vehicle's coverage map with the updated coverage service map).

Figure 4:
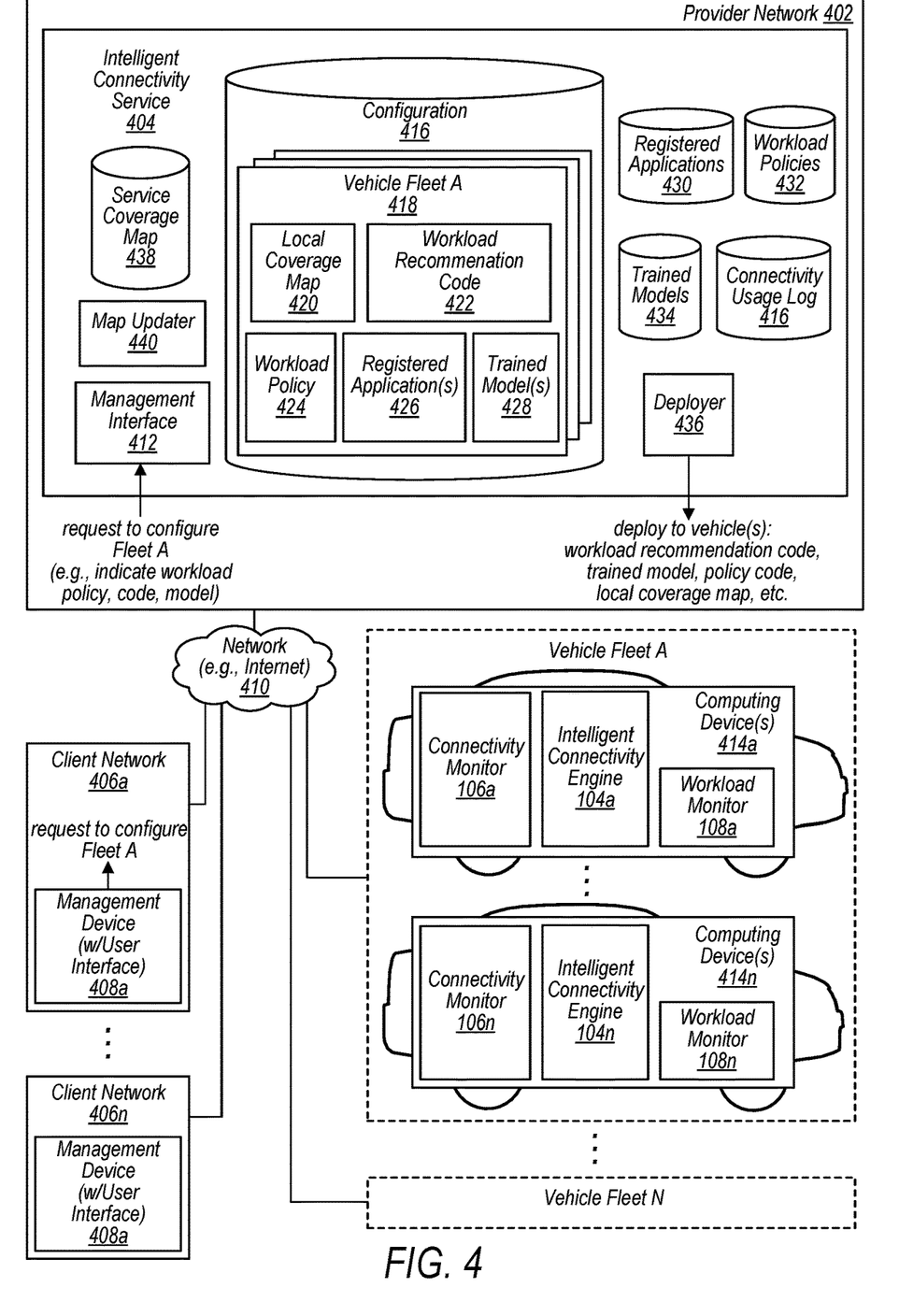
FIG. 4 is a logical block diagram illustrating a system for intelligent connectivity for vehicles, according to some embodiments.

FIG. 4 is a logical block diagram illustrating a system for intelligent connectivity for a vehicle, according to some embodiments.

In the depicted example, a remote service provider network 102 includes an intelligent connectivity service 404 that may be used to configure any number of vehicles to implement intelligent connectivity and to update a configuration for the vehicles to implement intelligent connectivity. In embodiments, any number of clients (e.g., businesses, individuals, and/or other organizations) of the provider network 402 may use the intelligent connectivity service 404. Each client may own and/or manage a corresponding remote client network 406 that may include any number of management devices 408 that the client (e.g., a user/administrator for the client) may use to manage/use the intelligent connectivity service 404 of the provider network 402. The client network 406 may include any number of other devices 118 (e.g., compute devices, storage devices, etc.).

The depicted example describes the use of an intelligent connectivity service to configure/update configuration of a vehicle (e.g., car, truck, motorcycle, or any other product that may facilitate movement of a person, object, and/or itself). However, various embodiments may use an intelligent connectivity service with any other product in the same or similar way as described for a vehicle. In other words, an intelligent connectivity service may be used by a client to configure/update configuration to implement intelligent connectivity for any type and/or number of manufactured products that each have one or more computing devices and may run any number of applications that use connectivity (e.g., appliances, manufacturing equipment, robots, mobile devices, entertainment systems, video game systems, or any other type of computing systems).

In embodiments, robots may take advantage of any of the intelligent connectivity techniques described herein. For example, a group of robots (or any other mobile entities) working at a farm (or any other geographical area) may each communicate with a base station that itself may provide communication capability (satellite, fiber, etc.) and/or edge compute capability. Each robot may include a certain amount of compute capability, but the connectivity option(s) for each robot may change over time, similar to a vehicle as described herein. Therefore, each robot may use an intelligent connectivity engine, connectivity monitor, and workload monitor in the same or similar manner as described herein for a vehicle. In embodiments, a robot may have a workload that uses the edge compute capability of the base station and may execute or delay execution of the workload, depending on the available connectivity options (e.g., strength of 3G or 4G signal). Similarly, in some embodiments a robot may have a workload that may use the edge compute capability of another of the robots and may execute or delay execution of the workload, depending on the available connectivity options with the other robot (e.g., strength of 3G or 4G signal).

A management device 408 or other device of a client network 406 may communicate with the intelligent connectivity service via a wide area network 410, such as the Internet. For example, the management device 408 may be used by a user to send messages/commands to a management interface 412 (e.g., application programming interface) of the intelligent connectivity service in order for the client to configure/update configuration of any number of vehicles (e.g., upload custom recommendation code to be used for vehicle of fleet A).

As shown, each configured vehicle may include any number of computing devices 414 that may each include an operating environment (e.g., an operating system and/or execution environment) that may run/execute a connectivity monitor 106, an intelligent connectivity engine 104, and a workload monitor 108. In various embodiments, containers may be used to implement some or all of the functions described herein for the connectivity monitor 106, an intelligent connectivity engine 104, and a workload monitor 108. A container may be a package that can be deployed to the vehicle's computing device/operating environment and may include application code, configurations, and dependencies as part of a single object. The container may be run on the computing device/operating environment as a resource-isolated process. This may ensure a reliable and consistent deployment across different types of operating environments on different vehicles.

The intelligent connectivity service stores a configuration 416 for any number of different vehicles and/or vehicle fleets. In embodiments, the configuration for a group of vehicles (e.g., a fleet) may be stored. For example, the configuration of vehicle fleet A 418 includes a local coverage map 420, workload recommendation code 422, a workload policy 424, an indication of registered application(s) 426, and trained model(s) 428 to be used by one or more vehicles of fleet A.

As shown, the intelligent connectivity service may include data stores that store an indication of registered applications 430, workload polices 432, and trained models 434 (for use in the connectivity monitor to predict a future state of antennas and/or other connectivity options). A client (e.g., using a management device) may select any number of the registered application, workload polices, and/or trained models to configure a vehicle or vehicle fleet.

A client may use the intelligent connectivity service to initially configure any number of vehicles and make updates to the configuration. For example, the service may receive, from the client (e.g., via management interface 412), an indication/selection of workload recommendation code to be deployed to one or more vehicles (e.g., vehicle fleet A). In response, the service may deploy (e.g., using the deployer 436) the workload recommendation code to the vehicle(s). In embodiments, the code may be uploaded by the client or may be selected from among one or more available options of workload recommendation code to be used. The workload code may be configured to perform any of the functions described herein (e.g., based at least on a current state of one or more connectivity options and execution criteria for respective workloads, assign at least one workload for current execution and at least another for future execution).

In embodiments, the service may receive, from the client (e.g., via management interface 412), an indication of a trained model to be deployed to one or more vehicles (e.g., vehicle fleet A). In response, the service may deploy (e.g., using the deployer 436) the trained model to the vehicle(s) (e.g., to the workload monitor). As described herein, the trained model may be configured to predict a future state for at least one of the connectivity options based at least on a current state of the at least one connectivity option.

The service may also receive, from the client (e.g., via management interface 412), an indication of a workload policy 424 to be implemented at one or more vehicles (e.g., vehicle fleet A). In response, the service may deploy policy code to the vehicle. For example, the policy code may be configured to select a given connectivity option from among the plurality of connectivity options based at least on the indicated workload policy.

In embodiments, the policy implemented at the vehicle(s) may be changed by the client at any time. The service may also receive, from the client (e.g., via management interface 412), an indication of an updated workload policy to be implemented at one or more vehicles (e.g., vehicle fleet A). In response, the service may deploy updated/new policy code to the vehicle. The updated/new policy code may be configured to select a given connectivity option from among the plurality of connectivity options based at least on the updated/new workload policy, which may result in different connectivity options being selected for given workload(s) of a group of workloads due to the different policy/policy code.

In embodiments, the service may also receive, from the client (e.g., via management interface 412), an indication of a registered application used on one or more vehicles (e.g., vehicle fleet A). In some embodiments, the request may indicate one or more connectivity options to be used by workloads of the registered application (e.g., 4G antenna, 5G antenna, power-line). In response, the service may indicate the registered application as part of the configuration. In embodiments, a client may add one or more new applications to the database of registered applications.

In some embodiments, the service may receive, from the client (e.g., via management interface 412), an indication of a local coverage map 420 to be deployed to one or more vehicles (e.g., vehicle fleet A). In some embodiments, the client may indicate/select the local coverage map as a portion of a global service coverage map 438 that may include a larger coverage map (e.g., covering more geographical area than the local coverage map). In response, the service may deploy (e.g., using the deployer 436) the local coverage map 420 to the vehicle(s) (e.g., to the connectivity monitor). As described herein, the local coverage map may be synched with the vehicle's current version of the local coverage map (e.g., used to update the vehicle's local coverage map).

In an embodiment, the map updater 440 of the service may update the service coverage map based on coverage data that is received from vehicle(s) and export the updated coverage service map to vehicle(s). For example, the map updater 440 may receive, from one or more vehicles of a fleet, coverage data that indicates coverage area for one or more radio protocols used by the one or more vehicles. The map updater may then update the coverage service map based on the coverage data to generate an updated coverage service map. The map updater may then send (e.g., export) the updated coverage service map (or a portion of the updated coverage service map that includes the updated local coverage map) to the one or more vehicles. Each of the vehicles may then update/synch its own local coverage map based on the updated coverage service map (or portion of the updated coverage service map) received from the intelligent connectivity service.

Figure 5:
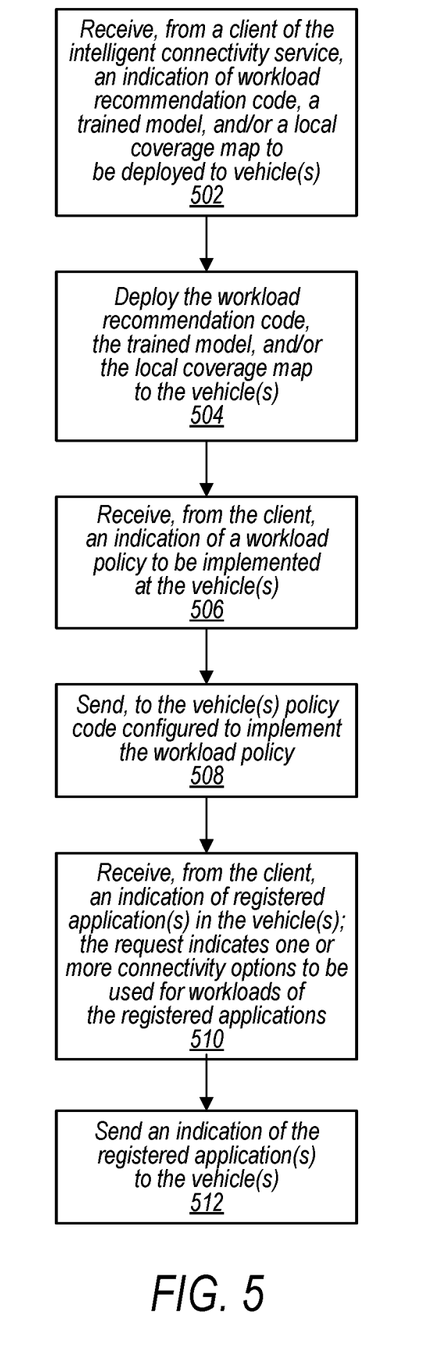
FIG. 5 is a high-level flowchart illustrating various methods and techniques to configure intelligent connectivity for vehicles, according to some embodiments.

FIG. 5 is a high-level flowchart illustrating various methods and techniques to configure intelligent connectivity for vehicles, according to some embodiments. In various embodiments, any of the functionality described for any portions of the flowcharts 5-7 may be performed by any of the components of FIGS. 1-4 and/or 8.

Figure 6:
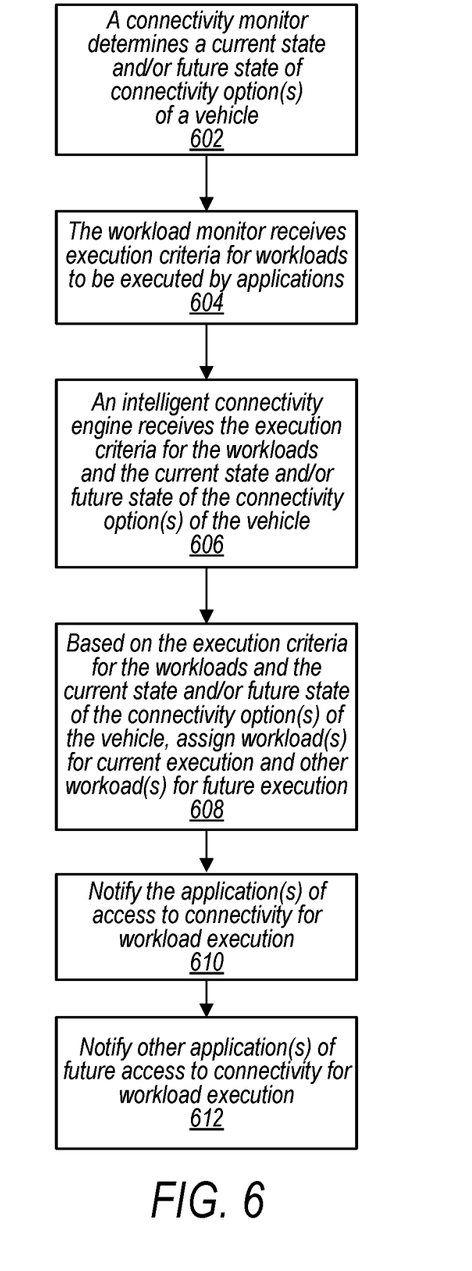
FIG. 6 is a high-level flowchart illustrating various methods and techniques to implement intelligent connectivity for vehicles, according to some embodiments.
Figure 7:
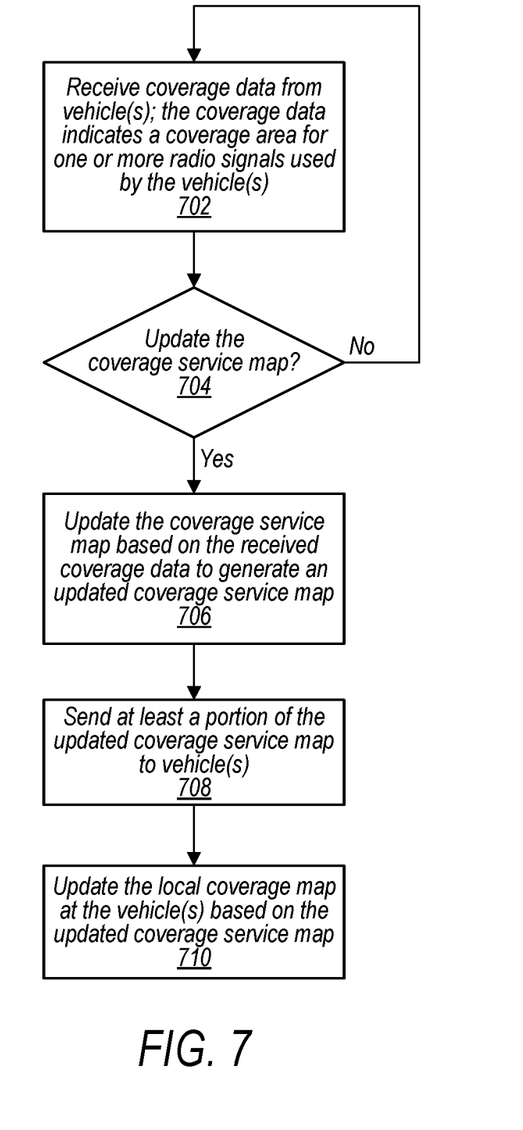
FIG. 7 is a high-level flowchart illustrating various methods and techniques to update a coverage map for vehicles, according to some embodiments.

These techniques, as well as the techniques discussed with regard to FIGS. 6-7, may be implemented using components or systems as described above with regard to FIGS. 1-4, as well as other types of components or systems, and thus the following discussion is not intended to be limiting as to the other types of systems that may implement the described techniques. For example, a portion of or all of the techniques or components may be implemented by a provider network and/or a computing device(s) of a vehicle.

At block 502, the intelligent connectivity service receives, from the client, an indication of workload recommendation code, a trained model, and/or a local coverage map to be deployed to vehicle(s). At block 504, in response to the received indication, the intelligent connectivity service deploys the workload recommendation code, trained model, and/or local coverage map to the vehicle(s).

At block 506, the intelligent connectivity service receives, from the client, an indication of a workload policy to be implemented at the vehicle(s). At block 504, in response to the received indication, the intelligent connectivity service sends, to the vehicles, policy code configured to implement the workload policy.

At block 510, the intelligent connectivity service receives, from the client, an indication of register application(s) used in the vehicle(s); the request may indicate one or more connectivity options to be used for workloads of the registered applications(s). At block 512, in response to the received indication, the intelligent connectivity service sends, to the vehicle(s), an indication of the registered application(s) and the one or more connectivity options to be used for the workloads of each registered application. In embodiments, the intelligent connectivity engine may register the applications locally, at the vehicle.

FIG. 6 is a high-level flowchart illustrating various methods and techniques to implement intelligent connectivity for vehicles, according to some embodiments.

At block 602, a connectivity monitor determines a current state and/or future state of connectivity option(s) of a vehicle. At block 604, a workload monitor receives execution criteria for workloads to be executed. At block 606, the intelligent connectivity engine receives the execution criteria for the workloads and the current state and/or future state of the connectivity option(s) of the vehicle.

At block 608, based on the execution criteria for the workloads and the current state and/or future state of the connectivity option(s) of the vehicle, the intelligent connectivity engine assigns workload(s) for current execution and other workoad(s) for future execution. At block 610, the intelligent connectivity engine notifies application(s) of current access to connectivity (e.g., a particular connectivity option indicated in the execution criteria) for workload execution.

At block 612, the intelligent connectivity engine notifies other application(s) of future access to connectivity (e.g., a particular connectivity option indicated in the execution criteria) for workload execution. At a later point in time (e.g., when execution criteria are met for the other workload(s), such as a particular antenna or other connectivity option becoming available), the intelligent connectivity engine may notify the other application(s) of current access to connectivity.

FIG. 7 is a high-level flowchart illustrating various methods and techniques to update a coverage map for vehicles, according to some embodiments.

At block 702, the intelligent connectivity service receives coverage data from vehicle(s); the coverage data indicates a coverage area for one or more radio signals used by the vehicle(s). At block 704, the intelligent connectivity service determines whether to update the coverage service map (e.g., stored at the service for one or more vehicle(s) of a fleet). For example, the service may update the coverage service map according to a periodic schedule or when a certain amount of coverage data has been received from one or more vehicles. If not, then the intelligent connectivity service returns to block 702, where it may receive additional coverage data from vehicle(s) at a later time.

At block 704, if the intelligent connectivity service determines to update the coverage service map, then at block 706, the intelligent connectivity service updates the coverage service map based on the received coverage data to generate an updated coverage service map. At block 708, the intelligent connectivity service sends at least a portion of the updated coverage service map to the vehicle(s). For example, the service may send a portion of the updated coverage service map that corresponds to a local coverage map used by the vehicles of a fleet. At block 710, each vehicle updates its local coverage map based on the updated coverage service map. This may allow the service to updated local coverage maps for a fleet by leveraging coverage data from many different vehicles.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors.

The program instructions may implement the functionality described herein (e.g., the functionality of the connectivity monitor, the workload monitor, the intelligent connectivity engine, the intelligent connectivity service, and any other components described herein). The various methods as illustrated in the figures and described herein represent example embodiments of methods. The order of any method may be changed, and various elements may be added, reordered, combined, omitted, modified, etc.

Figure 8:
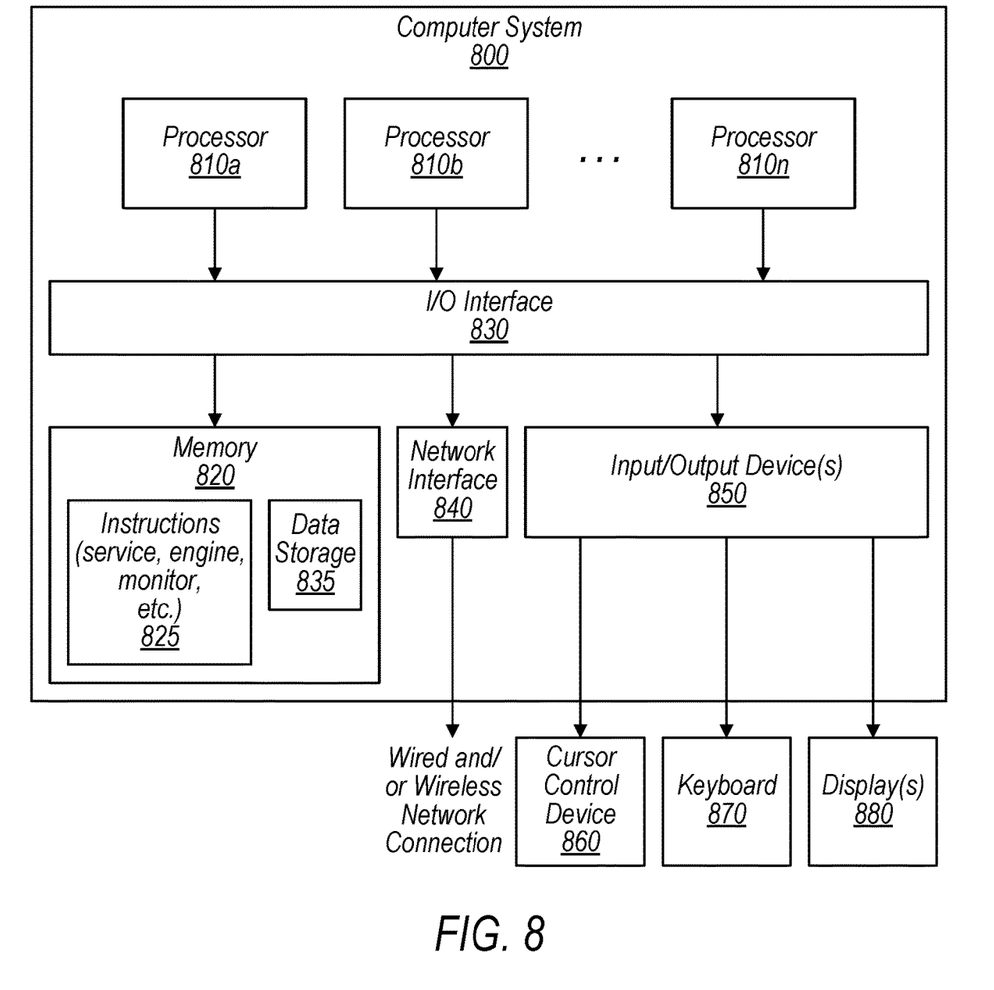
FIG. 8 is a block diagram illustrating an example computing system, according to some embodiments.

Embodiments implement intelligent connectivity for vehicles, which may be implemented using one or more of various systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the connectivity monitor, the workload monitor, the intelligent connectivity engine, the intelligent connectivity service, and any other components, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., workload criteria, applications, workloads, state of antenna or other connectivity option, coverage map, model, policy code, configuration data, data, metadata, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more computing devices for a vehicle, wherein the one or more computing devices store program instructions for implementing:
   a connectivity monitor, wherein the connectivity monitor is configured to:
   determine a current state of respective connectivity options of a plurality of connectivity options of the vehicle, wherein different connectivity options of the plurality of connectivity options are configured to communicate according to different protocols; and
   send to an intelligent connectivity engine the current state of the respective connectivity options;
   a workload monitor, wherein the workload monitor is configured to:
   receive execution criteria for respective workloads of a plurality of workloads to be executed, wherein the execution criteria comprise criteria for data transmission;
   send to an intelligent connectivity engine the execution criteria for the respective workloads; and
   the intelligent connectivity engine, wherein the intelligent connectivity engine is configured to:
   receive the current state of the respective connectivity options and the execution criteria for the respective workloads; and
   based at least on the current state of the respective connectivity options and the execution criteria for the respective workloads, assign at least one of the respective workloads for current execution and at least another of the respective workloads for execution to occur subsequent to the current execution of the at least one of the respective workloads.

2. The system as recited in claim 1, wherein the intelligent connectivity engine is further configured to:
   notify at least one application of access to connectivity for execution of the at least one workload; and
   notify at least another application of future access to connectivity for execution of the at least one other workload.

3. The system as recited in claim 1, wherein to assign the at least one other workload for subsequent execution, the intelligent connectivity engine is further configured to:
   determine that the current state of the at least one respective connectivity option is unable to satisfy execution criteria for the at least one other workload; and
   in response to the determination that the current state of the at least one respective connectivity option is unable to satisfy execution criteria for the at least one other workload, assign the at least one other workload for subsequent execution.

4. The system as recited in claim 3, wherein the connectivity monitor is further configured to predict a future state for the at least one connectivity option of the plurality of antennas, wherein the intelligent connectivity engine is configured to receive the predicted future state for the at least one connectivity option, and wherein to assign the at least one other workload for subsequent execution, the intelligent connectivity engine is further configured to:
   determine that the predicted future state for the at least one connectivity option is able to satisfy the execution criteria for the at least one other workload; and
   in response to the determination that the predicted future state for the at least one connectivity option is able to satisfy the execution criteria for the at least one other workload, assign the at least one other workload for subsequent execution at a time corresponding to the predicted future state for the at least one connectivity option.

5. The system as recited in claim 1, wherein to assign the at least one workload for current execution, the intelligent connectivity engine is further configured to:
based at least on the current state of the respective connectivity option and the execution criteria for the at least one workload, select a particular one of the respective connectivity options from among different ones of the respective connectivity options available for selection; and
assign the selected connectivity option to the at least one workload for transmission of data during execution of the workload.

6. A method, comprising:
performing, by one or more computing devices for a vehicle:
receiving a current state of one or more connectivity options of the vehicle, wherein a given connectivity option is configured to communicate according to a protocol;
receiving execution criteria for respective workloads of a plurality of workloads to be executed, wherein the execution criteria comprise criteria for data transmission, and wherein the criteria for data transmission for at least one of the respective workloads assigned for current execution is different than the criteria for data transmission for the at least another of the respective workloads assigned for subsequent execution; and
based at least on the current state of the one or more connectivity options and the different criteria for data transmission for the at least one workload and the at least another workload:
assigning the at least one workload for current execution; and
assigning the at least another workload for execution to occur subsequent to the current execution of the at least one workload.

7. The method as recited in claim 6, further comprising performing, by the one or more computing devices:
notify at least one application of access to connectivity for execution of the at least one workload; and
notify at least another application of future access to connectivity for execution of the at least one other workload.

8. The method as recited in claim 6, further comprising performing, by the one or more computing devices:
receiving a predicted future state for a connectivity option of the one or more connectivity options of the vehicle, wherein assigning at least the other workload for subsequent execution comprises assigning the other workload for execution at a time corresponding to the predicted future state of the connectivity option.

9. The method as recited in claim 8, further comprising performing, by the one or more computing devices:
predicting, by a trained model based at least on a current state of the connectivity option, the future state for the connectivity option, wherein the trained model is trained based at least on data indicating one or more previous states for the connectivity option.

10. The method as recited in claim 8, further comprising performing, by the one or more computing devices:
determining the predicted future state for the connectivity option based at least on one or more of:
a planned route for the vehicle,
a coverage map for a radio protocol used by the connectivity option, wherein at least a portion of the planned route is located within the coverage map, or
one or more environmental conditions for at least a portion of the planned route.

11. The method as recited in claim 6, wherein the execution criteria comprise one or more of:
available bandwidth to send data from the vehicle to another location or to receive data at the vehicle from another location,
maximum latency to send data from the vehicle to the other location or to receive data at the vehicle from the other location, or
a minimum amount of compute capability at the other location.

12. The method as recited in claim 6, wherein the connectivity options comprise one or more antennas, and further comprising performing, by the one or more computing devices:
receiving measurements of signal strength from at least one of the one or more antennas of the vehicle;
generating, based on the measurements of signal strength, coverage data that indicates coverage area for one or more radio protocols used by the one or more antennas of the vehicle; and
sending the coverage data to a remote provider network.

13. The method as recited in claim 6, wherein the connectivity options comprise one or more antennas, and further comprising performing, by the one or more computing devices:
receiving, from an application, an indication of an additional workload to be executed;
determining that the application is registered to use a particular one of the one or more antennas for workloads; and
in response to determining that the application is registered to use the particular antenna, registering the additional workload and reserving use of the particular antenna by the additional workload.

14. The method as recited in claim 6, wherein the connectivity options comprise a plurality of antennas, and further comprising performing, by the one or more computing devices:
receiving, from an application, a request for the current state of respective antennas of the plurality of antennas;
in response to the request, sending to the application the current state of respective antennas; and
receiving, from the application, an indication of an additional workload to be executed and a particular one of the respective antennas to be used for the additional workload; and
in response to receiving the indication of the additional workload and the particular antenna to be used for the additional workload, reserving use of the particular antenna by the additional workload.

* * * * *